US010227790B2

(12) United States Patent
Samuelsen (10) Patent No.: US 10,227,790 B2
(45) Date of Patent: Mar. 12, 2019

(54) METHOD FOR MOUNTING INTERNAL TOWER FITTINGS

(71) Applicant: SENVION SE, Hamburg (DE)

(72) Inventor: Olaf Samuelsen, Hünning (DE)

(73) Assignee: Senvion GmbH, Hamburg (DE)

( * ) Notice: Subject to any disclaimer, the term of this patent is extended or adjusted under 35 U.S.C. 154(b) by 0 days.

(21) Appl. No.: 14/915,510

(22) PCT Filed: Aug. 22, 2014

(86) PCT No.: PCT/EP2014/067894
§ 371 (c)(1),
(2) Date: Feb. 29, 2016

(87) PCT Pub. No.: WO2015/028400
PCT Pub. Date: Mar. 5, 2015

(65) Prior Publication Data
US 2016/0215520 A1    Jul. 28, 2016

(30) Foreign Application Priority Data

Aug. 27, 2013   (DE) ......................... 10 2013 217 088

(51) Int. Cl.
*E04H 12/34*   (2006.01)
*E04H 12/08*   (2006.01)
(Continued)

(52) U.S. Cl.
CPC ............. *E04H 12/34* (2013.01); *E04H 12/08* (2013.01); *E04H 12/12* (2013.01); *F03D 13/10* (2016.05); *F03D 80/80* (2016.05); *Y02E 10/728* (2013.01)

(58) Field of Classification Search
CPC ......... E04H 12/34; E04H 12/08; E04H 12/12; F03D 80/80; F03D 1/001; Y02E 10/728
(Continued)

(56) References Cited

U.S. PATENT DOCUMENTS 3,053,398 A * 9/1962 Liebherr ................. B66C 23/26
212/176
3,768,016 A * 10/1973 Townsend .............. H04B 7/155
182/178.1
(Continued)

FOREIGN PATENT DOCUMENTS

DE   20 2010 007 565   10/2010
DE   10 2009 041 982   4/2011
(Continued)

OTHER PUBLICATIONS

International Search Report and Written Opinion dated Nov. 5, 2014, directed to International Application No. PCT/EP2014/067894; 8 pages.

*Primary Examiner* — Joshua K Ihezie
(74) *Attorney, Agent, or Firm* — Morrison & Foerster LLP (57) ABSTRACT

A method for installing tower fittings by introducing at least two separate supply modules into a wind turbine tower, wherein a separate supply module structurally includes one segment each of at least two system components of the wind turbine tower, and wherein an upper segment end is arranged on an upper edge, and a lower segment end on a lower edge, of the supply module, including: arranging the upper edge of a first separate supply module at an upper end of the wind turbine tower; connecting an upper segment end of the first separate supply module to a lower segment end of a corresponding system component of a second separate supply module; and arranging the upper edge of the second separate supply module at the upper end of the wind turbine tower.

15 Claims, 8 Drawing Sheets

(51) Int. Cl.
  *E04H 12/12* (2006.01)
  *F03D 80/80* (2016.01)
  *F03D 13/10* (2016.01)

(58) Field of Classification Search
  USPC ...... 52/651.01, 651.02, 745.03, 745.04, 831, 52/79.4, 236.2, 745.01, 655.01, 745.18
  See application file for complete search history.

(56) References Cited

U.S. PATENT DOCUMENTS

| | | | | |
|---|---|---|---|---|
| 6,713,891 | B2* | 3/2004 | Kirkegaard | H02G 7/00 290/44 |
| 7,198,134 | B2* | 4/2007 | LeMieux | A62B 1/06 182/133 |
| 8,011,098 | B2* | 9/2011 | Vorhies | B66C 17/06 212/176 |
| 8,033,078 | B2* | 10/2011 | Llorente Gonzalez | F03D 13/20 52/236.2 |
| 8,413,405 | B2* | 4/2013 | Meesenburg | E04H 12/08 52/651.01 |
| 8,601,748 | B2* | 12/2013 | Delago | F03D 13/10 52/119 |
| 8,935,889 | B2* | 1/2015 | Samuelsen | E04H 12/28 52/40 |
| 9,238,923 | B2* | 1/2016 | Arlaban Gabeiras | E04H 12/342 |
| 2005/0247008 | A1* | 11/2005 | Fujiwara | E04G 1/20 52/651.1 |
| 2007/0045045 | A1* | 3/2007 | Deuer | A62B 1/06 182/8 |
| 2007/0296220 | A1* | 12/2007 | Kristensen | F03D 1/001 290/55 |
| 2009/0031668 | A1* | 2/2009 | Llorente Gonzalez | F03D 13/20 52/745.17 |
| 2011/0061314 | A1 | 3/2011 | Mühlhäuser | |
| 2011/0252738 | A1* | 10/2011 | Ilgaard | E04H 12/085 52/651.01 |
| 2012/0168116 | A1* | 7/2012 | Mello | F03D 1/001 165/47 |
| 2013/0034450 | A1* | 2/2013 | Samuelsen | E04H 12/28 416/244 R |
| 2014/0075860 | A1* | 3/2014 | Edenfeld | E04H 12/34 52/173.1 |
| 2014/0237932 | A1* | 8/2014 | Moestrup | E04H 12/342 52/651.01 |
| 2015/0292263 | A1* | 10/2015 | Hierl | E04G 5/007 182/128 |
| 2015/0345463 | A1* | 12/2015 | Nielsen | F03D 1/001 416/244 A |

FOREIGN PATENT DOCUMENTS

| | | |
|---|---|---|
| DE | 10 2010 015 075 | 10/2011 |
| DE | 20 2011 106 727 | 12/2011 |
| DE | 10 2010 048 547 | 4/2012 |

* cited by examiner

METHOD FOR MOUNTING INTERNAL TOWER FITTINGS

REFERENCE TO RELATED APPLICATIONS

This application is a national stage application under 35 USC 371 of International Application No. PCT/EP2014/062864, filed Jun. 18, 2014, which claims priority to German Application No. 20 2013 005 959.1, filed Jul. 3, 2013, the entire contents of which are incorporated herein by reference.

FIELD OF THE INVENTION

The invention relates to a method for installing tower fittings by introducing at least two separate supply modules into a wind turbine tower, wherein a separate supply module structurally comprises one segment each of at least two system components of the wind turbine tower, and wherein an upper segment end is arranged on an upper edge, and a lower segment end on a lower edge, of the supply module.

BACKGROUND OF THE INVENTION

Powerful wind turbines require large rotors and high wind speeds. High wind speeds are found far above the ground. The towers of the wind turbines therefore have a very high construction. In addition, high wind turbine towers permit larger rotors. For this purpose, the towers require a sufficiently high degree of stability in order to act as a support structure for the large and therefore also heavy rotors. Said towers are constructed locally at the construction site of the wind turbine since said towers are much too large for premanufacturing. It has proven successful to erect the towers from a plurality of concrete tower segments arranged one above another. The tower segments here can be completely or partially produced from semi-finished elements. High towers can thereby be efficiently erected even in remote areas. However, there is the problem of producing and installing the tower fittings which comprise, for example, conduction means for transmitting the electrical energy generated in the nacelle or for transmitting control signals for operating the wind turbine, or a climbing device for the operating personnel for climbing up the tower. The installation of the tower fittings in the erected tower is complicated and hazardous since work at a great height is partly also required.

DE 10 2010 015 075 A1 discloses segmenting at least two system components of the tower fittings and structurally combining said segments to form separate supply modules. The supply modules are preassembled at the construction site or ex works and, for installation, are introduced into the tower interior. A supply module is fastened here to the tower inner wall at the designated location. The segments of the system components of supply modules adjacent to one another are coupled to one another, for example via series connection devices. Manufacturing-induced tolerances in the tower segments are compensated for here either during the connection of supply modules adjacent to one another or at the supply module which is fastened at the upper end of the wind turbine tower.

It is known from DE 20 2011 106 727 U1 to introduce tubular segments successively through the door into the tower where the respective system components are then connected to one another. The supply system is thus constructed from the bottom upward and only mounted at the top of the tower in the final step.

Furthermore, it is known from DE 20 2010 007 565 U1 to suspend preassembled interior fittings on the tower flange in each case, as a result of which only a construction from the bottom upward is possible. The installation of the interior fittings is preferably carried out in this case while the tower is still in a horizontal position.

SUMMARY OF THE INVENTION

An object on which the invention is based is the provision of a method which further simplifies the installation of the tower fittings and increases the safety of the installation personnel during the installation of the tower fittings.

The object is achieved by the features as broadly described below. Advantageous developments are described in the detailed embodiments below.

In a method for installing tower fittings by introducing at least two separate supply modules into a wind turbine tower, wherein a separate supply module structurally comprises one segment each of at least two system components of the wind turbine tower, and wherein an upper segment end is arranged on an upper edge, and a lower segment end on a lower edge, of the supply module, provision is made according to the invention for the method to comprise the following steps: arranging the upper edge of a first separate supply module at an upper end of the wind turbine tower; connecting an upper segment end of the first separate supply module to a lower segment end of the corresponding system component of a second separate supply module; and arranging the upper edge of the second separate supply module at the upper end of the wind turbine tower.

First of all, a few terms will be explained in more detail below:

A system component is understood as meaning components of the wind turbine that are installed in the tower of the wind turbine in order to enable the maintenance and operation thereof. Said components can be, for example, power conduction means, signal conduction means, illuminating means or a climbing device for operating personnel.

An upper edge is understood as meaning that edge of a supply module which, in the fitted position, is aligned with the nacelle of the wind turbine. A lower edge is understood as meaning that edge of the supply module which is directed toward the tower base.

An upper end of the wind turbine tower is understood as meaning a region at the upper end of the tower. Said region does not necessarily have to be arranged directly at the highest point of the wind turbine tower. It may also be arranged a few meters below the highest point. In the case of towers composed of a different material in sections, for example a concrete tower at the bottom and a tubular steel tower placed on at the top, each upper end of a portion is an "upper end" within the meaning of the invention.

The invention is based on the finding that the separate supply modules can be connected to one another as they are being introduced into the wind turbine tower, before said supply modules are fastened, optionally in their entirety, to the tower inner wall. During the introduction into the tower interior, the supply modules are inserted from above, that is to say said supply modules are guided past the upper end of the wind turbine tower. The upper edge of the first separate supply module introduced first is arranged there on the lower edge of the second separate supply module to be introduced next. The segments of the system components of the two separate supply modules are connected to each other via the segment ends arranged on the edges. The separate supply modules which are now connected to each other are then lowered downward until the upper edge of the second supply module is arranged at the upper end of the wind turbine tower. The operation is repeated until all of the supply modules which are to be installed have been introduced into the tower interior. The separate supply modules which are connected to each other are finally then fastened to the inner wall of the wind turbine tower after the final separate supply module has been arranged at the upper end of the wind turbine tower and the completely assembled supply module has been brought into the final installation position.

The supply modules are therefore connected successively to one another and lowered into the tower. The connecting work for joining together the supply modules can therefore be carried out at a central, stationary work site. The installation personnel no longer needs to handle the connecting points between the supply modules along the tower inner wall, but instead the supply modules which are to be installed migrate, as it were, past the stationary work site. Since a stationary working platform for the installation personnel is customarily provided in any case at the upper end of the wind turbine tower, no additional outlay is required. In addition, said working platform provides greater safety than mobile working devices which would have to be arranged in a vertically movable manner on the tower inner wall. Furthermore, by connecting the supply modules prior to fastening same to the wind turbine tower, manufacturing-induced tower tolerances are circumvented. The connections of the segments of the system components to the upper end of the wind turbine tower are always arranged in a defined position relative to the tip of the tower. The position of the lower end of the supply modules which are connected to one another is no longer of importance. Compensating work needs only to be carried out—if at all—at the tower base. Since the work is not carried out there at a great height, the safety of the installation personnel should be ensured in a simple manner. It is now no longer necessary to carry out compensating work on the basis of the tower tolerances at each connecting point between the separate supply modules. This considerably simplifies the installation of the tower fittings.

Furthermore, the fastening to the tower inner wall in particular prevents the supply module from being displaced in a horizontal plane. The main load in terms of weight of the supply module continues to be supported by the suspension at the upper tower end.

It is expedient to provide a working platform at the upper end of the wind turbine tower prior to the introduction of the separate supply modules. The safety of the installation personnel is therefore increased and the connecting work between the supply modules is facilitated further.

In order further to increase the safety during the connecting work, provision is advantageously made, prior to the introduction of the separate supply modules into the wind turbine tower, to provide a holding apparatus at the upper end of the wind turbine tower for the at least temporary suspension of a separate supply module. The holding apparatus advantageously comprises at least one connecting device for the connection to a separate supply module. Furthermore, the holding apparatus expediently has at least one load ring which is fastened to the tower wall or tower upper edge, wherein the connecting device comprises at least one shackle or a lifting sling. The first separate supply module can advantageously therefore be suspended at the upper end of the wind turbine tower before the segments of the system components are connected to those of the second separate supply module. The suspended supply module is secured by the holding device at the upper end of the wind turbine tower, and therefore the connection of the system component segments to a supply module arranged above the suspended supply module is further simplified. The design of the holding device, comprising a load ring and a shackle or a lifting sling, permits a simple connection of the upper edge of the suspended supply module to the holding apparatus. For this purpose, the supply module can have a support plate to which the connecting devices are fastened.

After the introduction of the final separate supply module, the latter can be fastened to the tower wall or tower upper edge by means of the load ring.

In an alternative embodiment, the support plate can be designed as an angled support plate for fastening the final separate supply module to the tower wall or tower upper edge. With the aid of the angled support plate, the final separate supply module can be hung over the tower upper edge and fastened to the tower wall or tower upper edge. The fastening outlay for the final separate supply module to the tower wall or tower upper edge is therefore reduced.

The holding apparatus can furthermore advantageously comprise at least one support element which is fastened to the tower wall or to the tower upper edge and to which a support module comprising a mounting portion is releasably fastened, wherein the supply module has a mounting element with which the separate supply module, after the arrangement of the upper edge at an upper end of the wind turbine tower, is mounted on the mounting portion of the support module. For this purpose, the support module has a mounting portion in which the mounting element can be arranged. The mounting element is supported by the mounting portion. A simple mounting of the separate supply modules on the support element is made possible with the support module. The separate supply modules can therefore be suspended in an uncomplicated manner on the upper edge of the wind turbine tower. Given a suitable design of the tower upper edge, the support module can be fastened to the tower upper edge even without the use of a support element. For the temporary suspension on the upper edge of the wind turbine tower, the supply modules do not require any fastening to the holding apparatus by means of the shackles. The shackles can optionally be used for fastening the separate supply modules after the final separate supply module has been introduced into the tower interior.

The wind turbine tower is advantageously formed from at least two tower segments. Furthermore, it is expedient that the separate supply modules span a plurality of tower segments. A smaller number of separate supply modules than the number of tower segments is therefore required for fitting into the tower interior. This reduces the amount of required connecting work between the supply modules, and further simplifies and accelerates the installation of the tower fittings. To reduce the diversity of variants of the separate supply modules, it is expedient to design both the lowermost supply module in each case and the supply modules in each case lying in between to be identical. A rough adaptation to the respective tower height is achieved via the number of supply modules lying in between and to be mounted. The precise coordination with the ultimately required length of the complete supply module is achieved by adaptation of the uppermost separate supply module.

The system components expediently comprise power conduction means, signal conduction means, illuminating means and/or a climbing device for operating personnel, wherein the illuminating means comprise lamps arranged discretely or continuously.

A tubular steel tower can advantageously be installed as an upper part of the wind turbine tower, wherein the lower part is a concrete tower. The supply modules are advantageously introduced into the concrete tower prior to the placing-on of a tubular steel tower. The system components can be installed in the tubular steel tower ex works, on the construction site or after the tubular steel tower has been erected. By fitting the supply modules as per the method according to the invention before the tubular steel tower is erected, it is ensured that the upper edge of the supply module fitted last in the concrete tower bears against a defined point relative to the upper end of the wind turbine tower. The coupling between the system components installed in the tubular steel tower and the system components of the concrete tower can therefore take place without special compensating work. Furthermore, a support plate, which is of angled design, of a supply module introduced last can be connected to the tubular steel tower in order to prevent the support plate from slipping off a tower upper edge of a concrete tower.

It is furthermore advantageous, prior to the introduction of the separate supply modules into the wind turbine tower, to fasten at least one fastening apparatus to at least one of the separate supply modules, said fastening apparatus having a clamping element which is connected to the supply module and a guide element, comprising a fastening piece projecting laterally on the supply module, which is arranged between the clamping element and the supply module. Projecting laterally on the supply module is understood as meaning that, when a supply module hangs on the tower inner wall, the fastening piece runs along the wall and the supply module does not cover the fastening piece.

The fastening apparatuses can therefore be introduced together with the supply modules into the tower interior, which further simplifies the fitting of the separate supply modules. The guide element is movable here in a vertical direction along the separate supply module, and therefore the guide element can be arranged flexibly along the separate supply module.

It is furthermore advantageously provided here, after the introduction of a final separate supply module, to fasten the fastening apparatus to the tower wall of the wind turbine tower by means of the fastening piece, and to clamp the guide element to the supply module by means of the clamping element. Alternatively to the clamping element, a locking element may also be provided, the locking element releasably fastening and at the same time locking the guide element to the supply module.

The fastening pieces can be reached directly from the front because of the lateral projection thereof from the supply modules. The installation personnel can therefore easily reach the fastening pieces and in an uncomplicated manner carry out the fastening of the supply modules introduced into the tower interior. By means of the fastening of the fastening pieces to the tower wall, the supply modules are secured in the horizontal direction. A vertical displacement for aligning the supply modules is furthermore permitted until the guide element of the fastening apparatus is clamped by means of the clamping element. In order to secure the separate supply modules in the vertical direction, the guide element is clamped between the clamping element and the separate supply module. The clamping can be brought about by fastening elements which press the clamping element onto the supply module. The fastening elements can be actuated here from the front side of the supply module. The supply module therefore cannot be moved further along the guide element.

The invention furthermore relates to a wind turbine tower, comprising a holding device for the suspension of a separate supply module at the upper end of a wind turbine tower for carrying out the abovementioned method. Reference is made to the above description for explanation purposes.

BRIEF DESCRIPTION OF THE DRAWINGS

The invention is explained in more detail below with reference to the attached drawing in which an advantageous embodiment is illustrated. In the drawing.

DETAILED DESCRIPTION OF THE INVENTION

Figure 1:
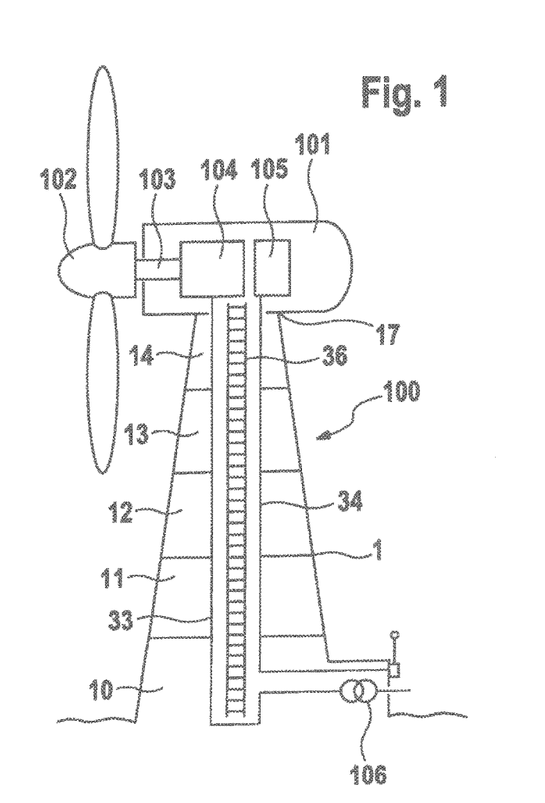
FIG. 1 shows a schematic illustration of a wind turbine with tower fittings.
Figure 4:
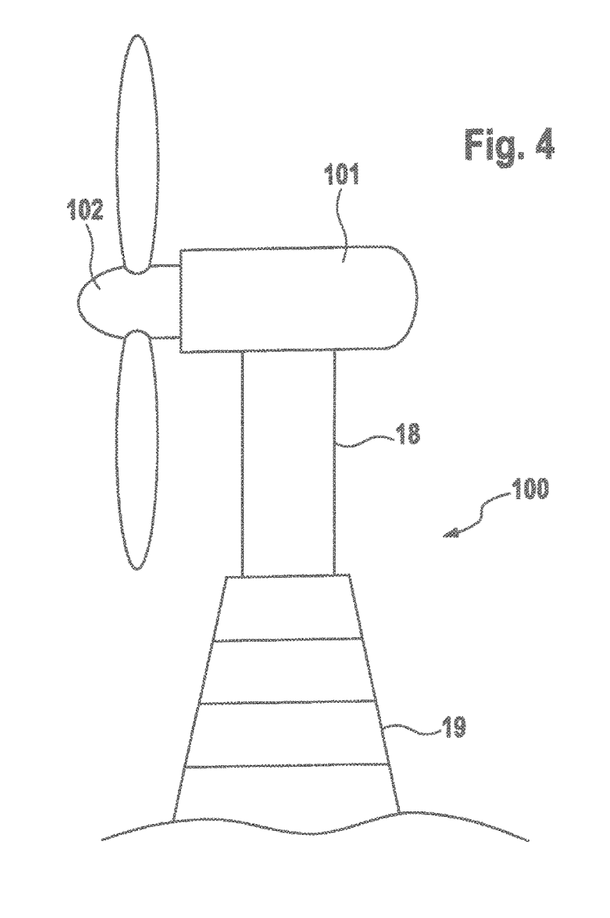
FIG. 4 shows a schematic illustration of a hybrid tower.

The method is carried out for the erection of a wind turbine, denoted in the entirety thereof by the reference number 100. The wind turbine 100 comprises a wind turbine tower 1 which is erected from a plurality of tower segments 10, 11, 12, 13, 14, 15, 16 and is designed as a hybrid tower. The lower part of the hybrid tower is a concrete tower 19 and the upper part is a tubular steel tower 18. Furthermore, the wind turbine 100 comprises a nacelle 101, which is connected to an upper end 17 of the wind turbine tower 1, and a rotor 102, which is mounted rotatably on one side of the nacelle 101. The rotor 102 is connected to an electric generator 104 via a shaft 103. Furthermore, the wind turbine 100 comprises an operation controller 105 which is connected to the generator 104 and to the rotor 102 via signal lines. The operation controller 105 and the generator 104 are arranged in the nacelle 101. Furthermore, at the base of the wind turbine tower 1, the wind turbine 100 comprises a transformer 106 for connection to the electrical grid. The generator 104 and the transformer 106 are connected via power conduction means 33 for transmitting the power generated by the generator 104 to the grid.

Furthermore, a climbing device 36, which includes illuminating means 35, for operating personnel is fastened in the interior of the wind turbine tower 1 to the tower inner wall, wherein the illuminating means comprise lamps arranged discretely or continuously. In order to activate the operation controller 105, signal conduction means 34 are provided in the tower interior. The power conduction means 33, signal conduction means 34, illuminating means 35 and the climbing device 36 for operating personnel are referred to in summary as system components 33, 34, 35, 36.

The system components 33, 34, 35, 36 are divided in each case into individual segments. The segments of at least two different system components 33, 34, 35, 36 are structurally combined to form a separate supply module 3, 4. The structural combining simplifies the fitting of the supply modules 3, 4 after the wind turbine tower 1 has been erected.

The supply modules 3, 4 each have an upper edge 37, 47 and a lower edge 38, 48. The upper segment end 30, 40 of the system components 33, 34, 35, 36 is arranged on the upper edge 37, 47. Accordingly, the lower segment end 31, 41 of the system components 33, 34, 35, 36 is arranged on the lower edge 38, 48 of the separate supply module 3, 4.

In a first preferred embodiment, the separate supply modules 3, 4 can be preassembled at the works. Alternatively, in a second preferred embodiment, the separate supply modules 3, 4 can be assembled at the construction site. The preassembly of the supply modules can take place in the horizontal position.

The wind turbine tower 1 is erected from the tower segments 10 to 16. A working platform 6 is installed at the upper end 17 of the wind turbine tower 1 after erection. The working platform 6 is used for the installation personnel to be on during the erection and installation work on the wind turbine tower 1. Furthermore, the working platform can be used for subsequent maintenance work, in particular at the transition piece to the hybrid tower. The working platform 6 can have rails and eyes for safety ropes.

The working platform 6 can extend over the entire tower inside diameter and can have a suitable cutout for the system components. The separate supply modules are then guided downward through the cutout in the working platform 6. Individual supply modules can be provided with additional components (for example feed boxes), as a result of which the cross section of the supply modules is increased. In order also to permit the fitting of said separate supply modules, the working platform 6 can be equipped with a floor flap, as a result of which the cutout in the working platform can be temporarily enlarged for the passage of said additional components.

Figure 3A:
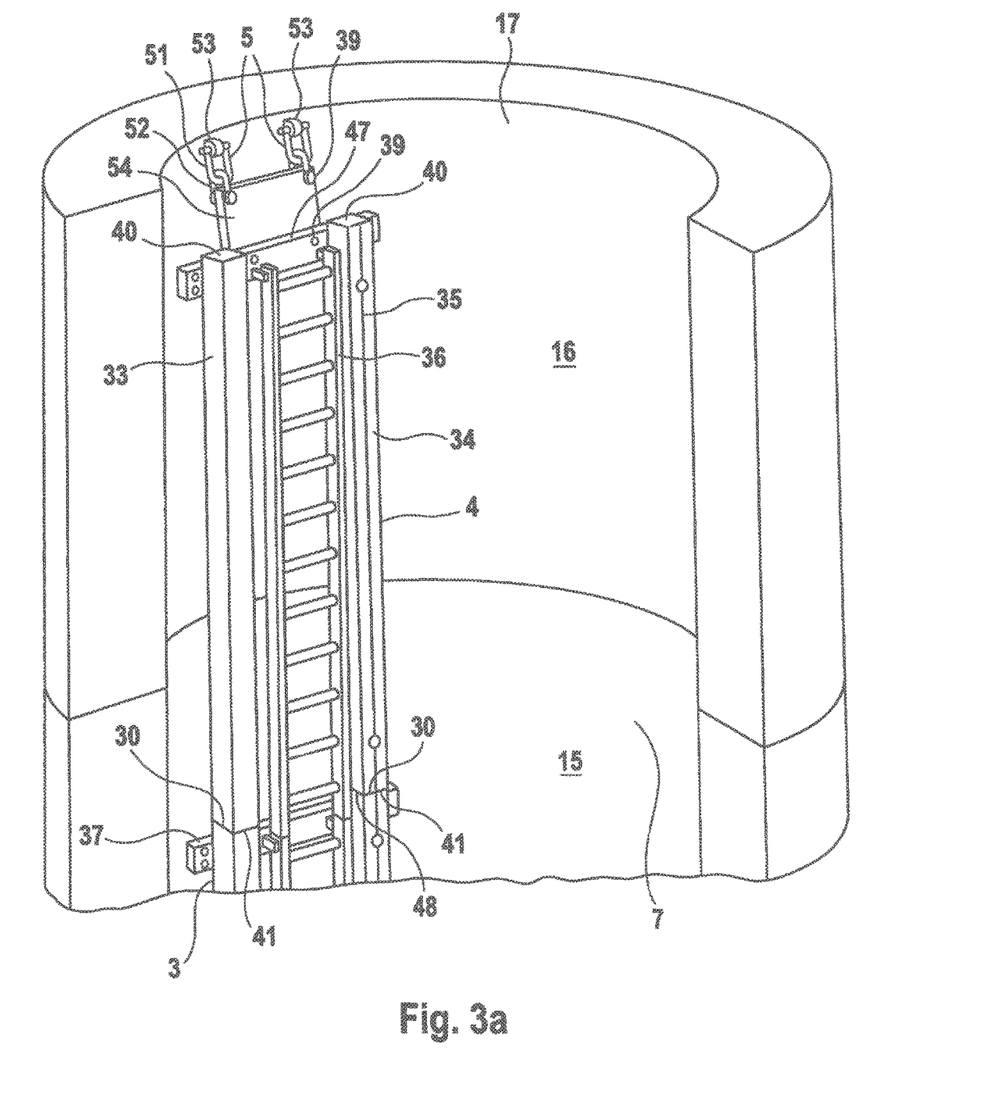
FIGS. 3a, b show a schematic illustration of the supply modules suspended in the tower interior on a holding apparatus, with (a) shackles and (b) lifting slings.
Figure 3B:
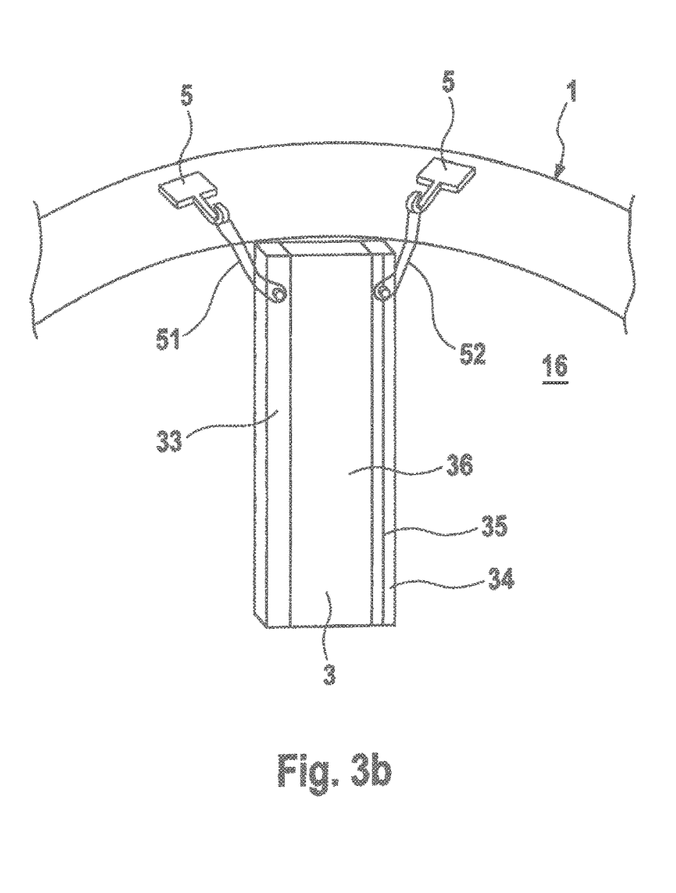

Furthermore, for the preparation of the fitting of the separate supply modules 3, 4, a holding device 5 is fastened to the upper end 17 of the wind turbine tower 1. In a first embodiment, the holding device 5 comprises two connecting devices 51, 52 for the connection to a separate supply module 3, 4. A connecting device 51, 52 is formed from two shackles, which are coupled to each other and are fastened to a load ring 53, which is fastened to the tower wall. A supply module 3, 4 can be suspended on the shackles by means of a support plate 54 which has eyes 39 for this purpose. The holding device 5 is designed here in such a manner that it can be loaded with the entire weight of all of the separate supply modules 3, 4 to be fitted.

Figure 8:
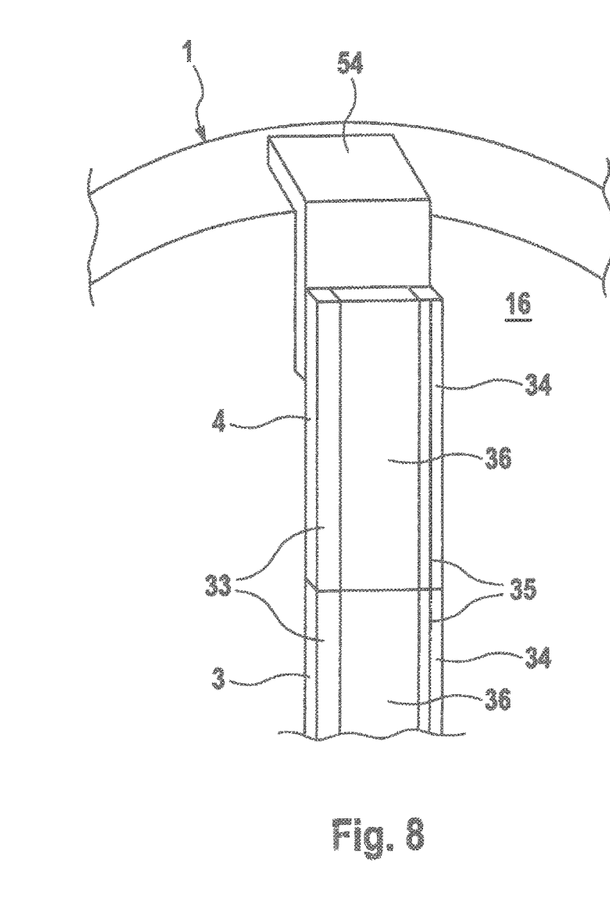
FIG. 8 shows a schematic illustration of the final supply module fastened to an angled support plate.

However, in a second alternative embodiment, the support plate 54 can also be designed as an elbow and, for the temporary suspension of a separate supply module 3, 4, can be hung directly over the tower upper edge. The support plate 54 is then fastened to the tower upper edge, for example by means of bolts. In addition, precision bolts may be provided as security against slipping off.

Figure 5A:
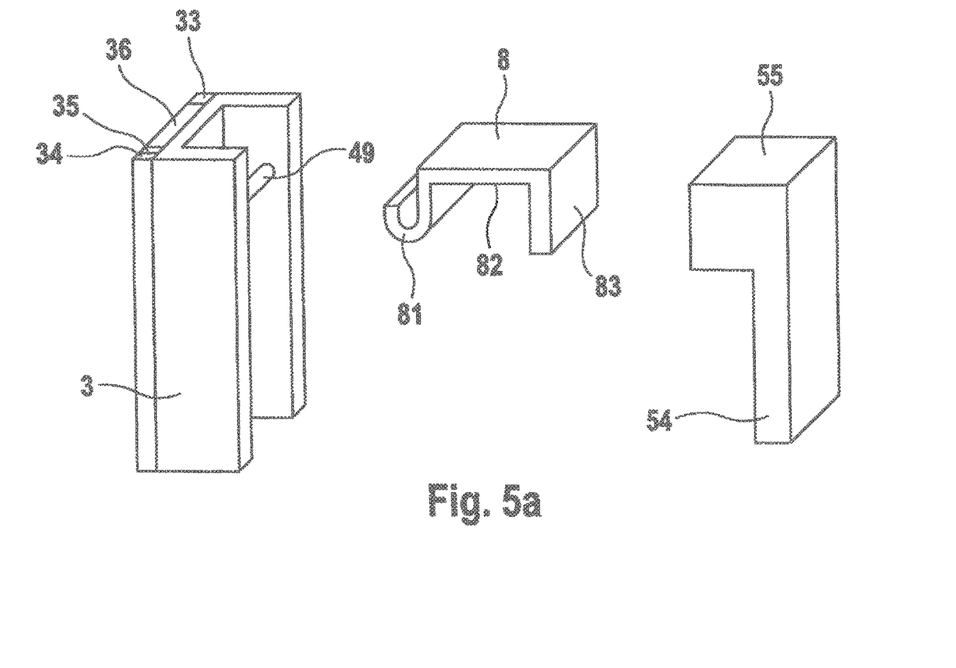
FIGS. 5a, b show a schematic illustration of a supply module, a support module and a support element in the separate state (a) and mounted state (b)
Figure 5B:
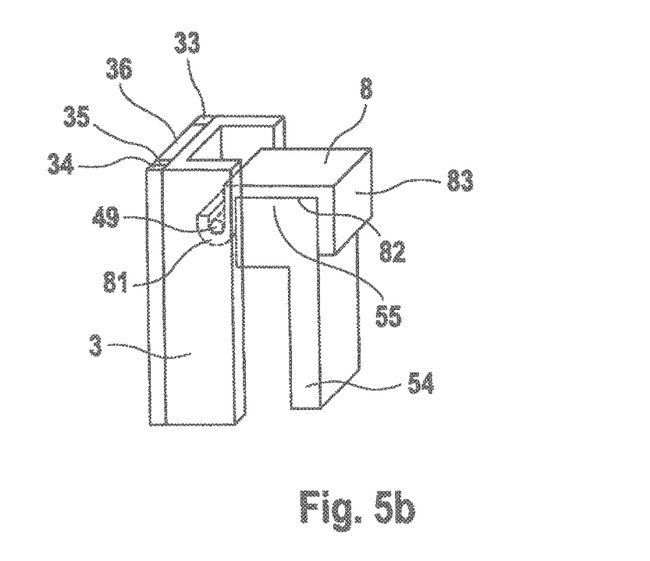

Furthermore, in a third embodiment, a support element 55, on which a support module 8 can be mounted, is provided on the holding apparatus 5. For this purpose, the support module 8 has a resting portion 82 which is formed in a complementary manner with respect to the support element 55 and is bordered by a flange 83. The resting portion 82 is arranged on the support element 55. The support module 8 is secured against displacement from the support element 55 by means of the flange 83. The support module 8 furthermore has a mounting portion 81. A mounting element 49 fastened to the separate supply module 3, 4 can be arranged in the mounting portion 81. It is thus possible to suspend the separate supply modules 3, 4 on the support module 8 in an uncomplicated manner after introduction into the wind turbine tower 1. Given a suitable design of the tower upper edge, the support module 8 can be fastened to the tower upper edge even without the use of a support element 55.

Figure 6:
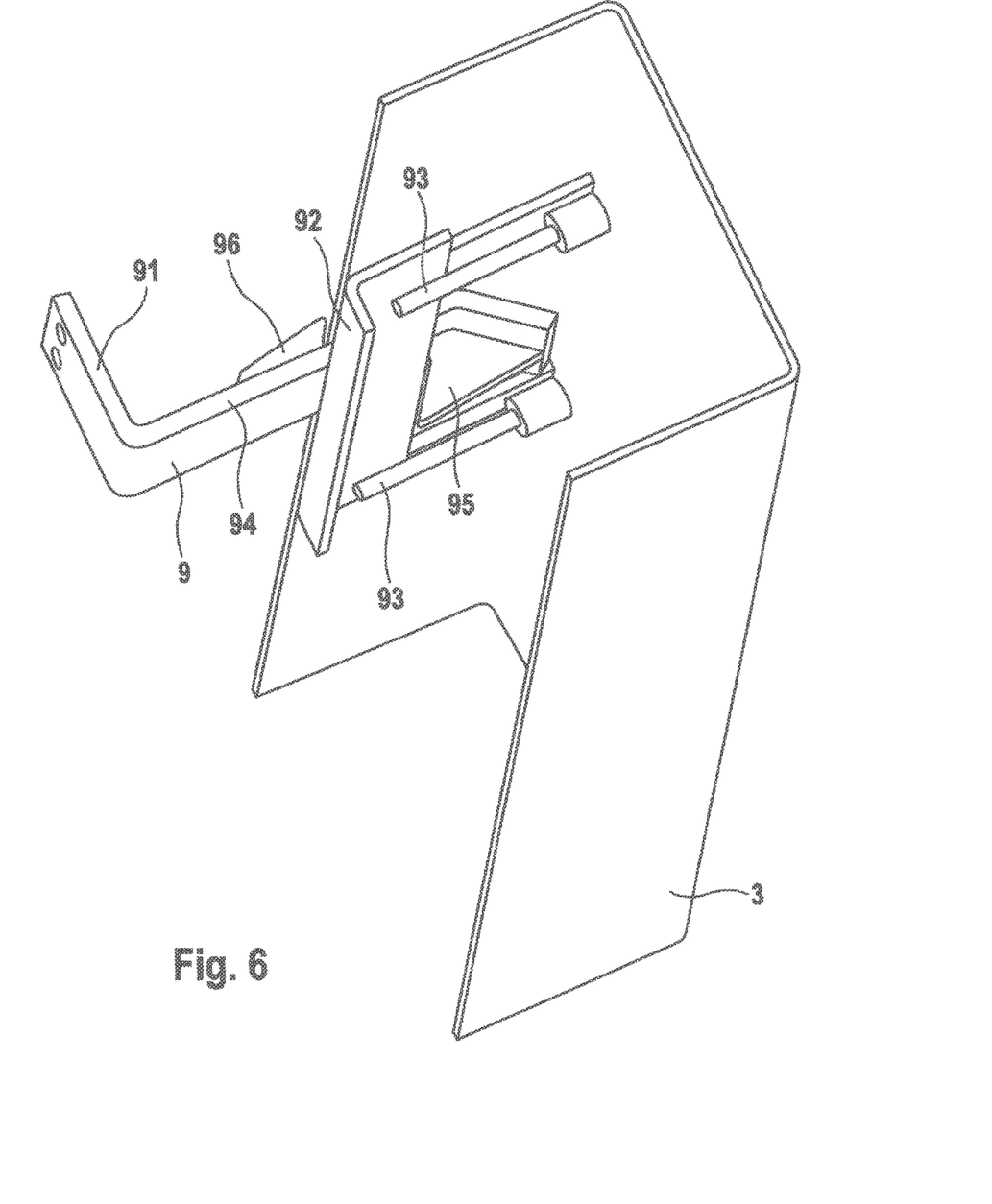
FIG. 6 shows a schematic illustration of a fastening apparatus arranged on a supply module.
Figure 7:
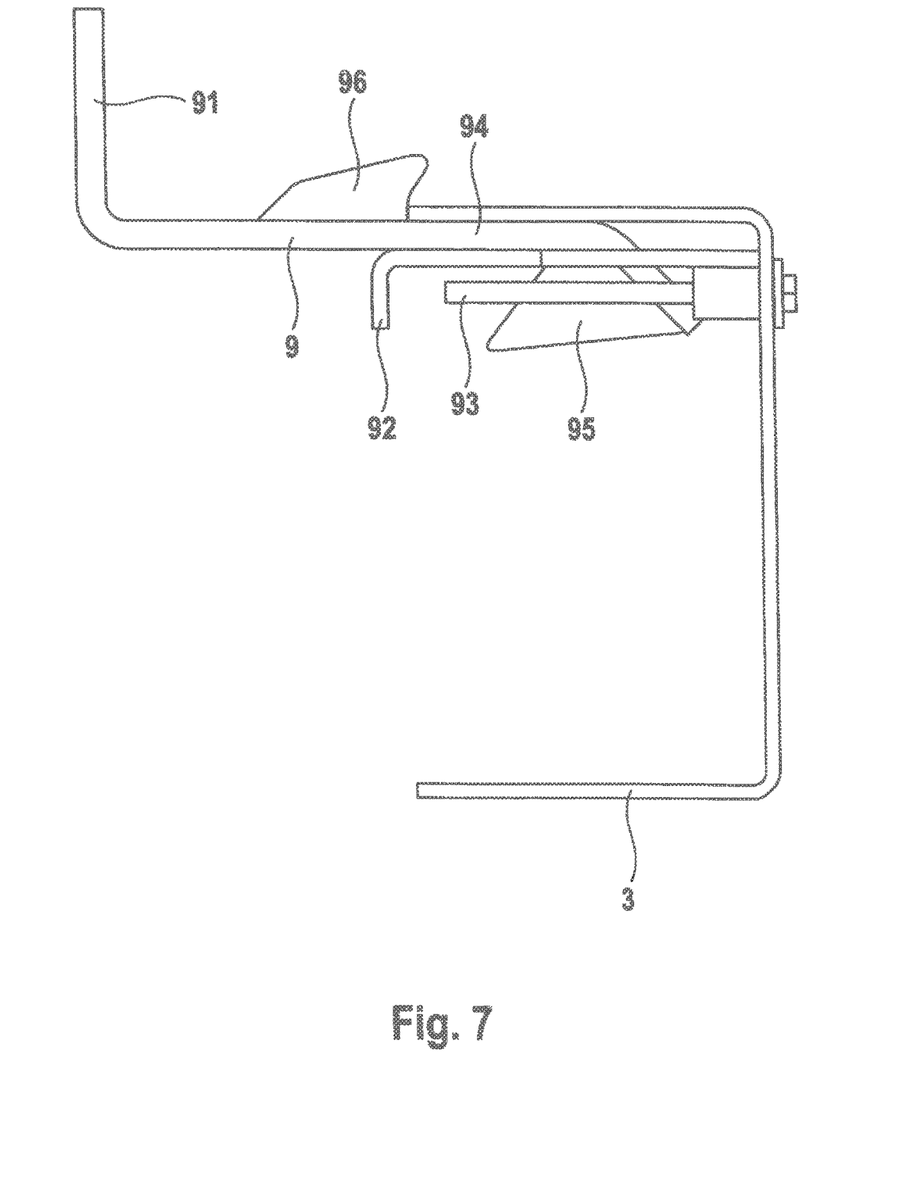
FIG. 7 shows a schematic cross-sectional view of a fastening apparatus arranged on a supply module.

By means of the use of lifting slings, the suspension of the supply modules 3, 4 on the support module 8 can be further simplified. For the fastening to the holding apparatus 5 after removal of the support module 8, the final separate supply module 4 introduced into the wind turbine tower 1 can be fastened to the shackles or to the tower upper edge directly via an angled support plate 54. A fastening apparatus 9 is provided for the final fastening of the separate supply modules 3, 4 to the tower inner wall 7. The fastening apparatus 9 comprises a clamping element 92 which is fastened to the support module 3, 4 by means of fastening elements 93. The fastening elements 93 are reachable from the front side of the separate supply modules 3, 4 and can be actuated from there. A guide element 94 is provided between the clamping element 92 and the supply module 3, 4. The guide element 94 furthermore has spacers 95, 96 and a fastening piece 91. The fastening piece 91 projects laterally from the supply module. It can easily be reached by the installation personnel for connection to the tower wall. The spacer 96 spaces the separate supply module 3, 4 and the wall. The spacer 95 furthermore acts as a resting element and guide element for the clamping element 92.

By actuation of the fastening elements 93, the clamping element 92 is pressed against the separate supply module 3, 4. The clamping element 92 presses here onto the guide element 94 via the spacer 95. As a result, the guide element 94 is clamped between the clamping element 92 and the separate supply module 3, 4.

Figure 2A:
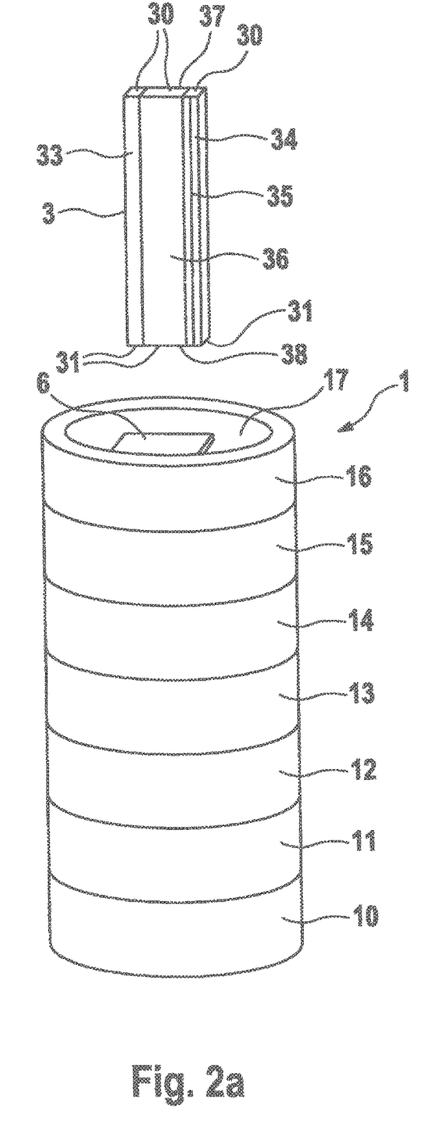
FIGS. 2a-d show a schematic illustration of individual method steps.

FIG. 2a illustrates a wind turbine tower 1 with a working platform 6 at the upper end 17 thereof, said wind turbine tower having been erected from the tower segments 10 to 16. The tower segments 10 to 16 form a concrete tower 19 which, in this preferred embodiment, acts as a lower part of a hybrid tower.

In order to introduce the supply modules into the wind turbine tower 1, the holding device 5 is installed at the upper end of the wind turbine tower 1. A support module 8 is placed onto the holding device 5.

For the fitting of the system components, a first separate supply module 3, which in the completely constructed state of the wind turbine 100 is arranged at the base of the wind turbine tower 1, is disposed onto the upper end 17 of the wind turbine tower 1 with a crane (not illustrated). The guide elements 94 of the fastening apparatuses 9 fastened to the separate supply module 3 are still free here and can be moved along the supply module 3 in the vertical direction.

The installation personnel on the working platform 6 guide the first separate supply module 3 during the subsequent lowering thereof into the interior of the wind turbine tower 1.

For better clarity, the wall portions concealing the tower interior have been omitted in FIGS. 2b, 2c, 2d, 3a, 3d and 8 such that the tower inner wall 7 is visible.

Figure 2B:
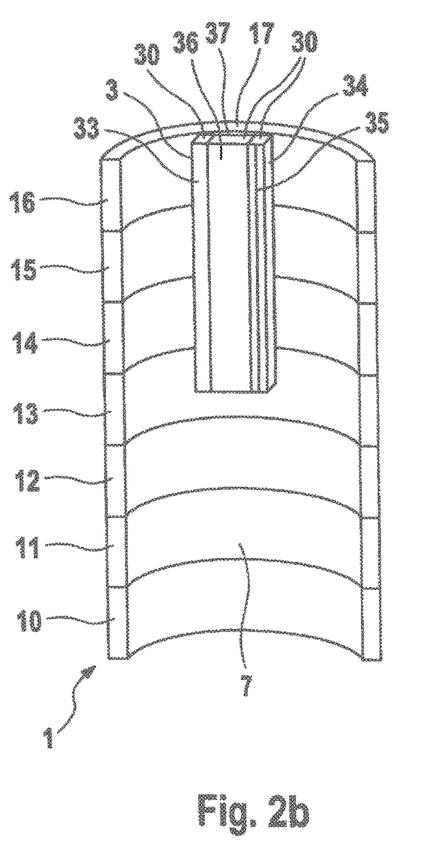

The first separate supply module 3 is lowered into the tower interior until the upper edge 37 of the supply module 3 is arranged at the upper end 17 of the wind turbine tower 1. At the same time, the upper edge is arranged on the working platform 6 in such a manner that the installation personnel can carry out work on the upper edge 37 from the working platform. The first separate supply module 3 is hung onto the holding device 5 at the mounting portion 81 of the support module 8 by means of the mounting element 49. The first separate supply module 3 is then released by the crane and hangs with its full weight on the holding device 5. Furthermore, the upper segment ends 30 of the system components 33, 34, 35, 36 are likewise arranged at the upper end 17 of the wind turbine tower 1. The first separate supply module 3 spans a plurality of the tower segments 10 to 16. That is to say the upper edge 37 of the first separate supply module 3 is arranged on a different tower segment 10 to 16 than the lower edge 38 of the first separate supply module 3.

Figures 2C, 2D:
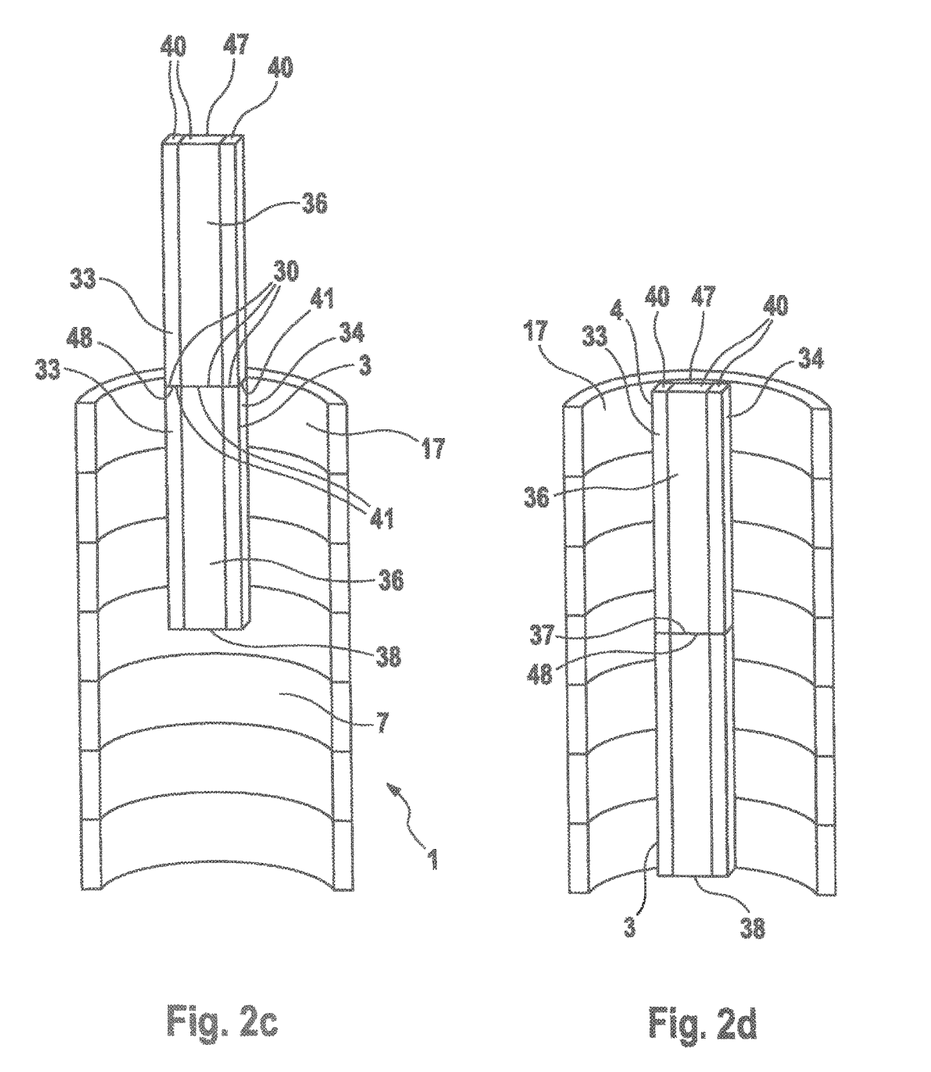

In a further step, the second separate supply module 4 is raised with the crane and arranged with its lower edge 48 on the upper edge 37 of the first separate supply module 3. The lower segment ends 41 of the system components 33, 34, 35, 36 of the second separate supply module 4 are aligned with the upper segment ends 30 of the system components 33, 34, 35, 36 of the first separate supply module 3. After the alignment, the upper segment ends 30 are connected to the lower segment ends 41 by the installation personnel. The installation personnel can carry this out from the working platform 6. After the connection of the upper segment ends 30 and the lower segment ends 41, the first separate supply module 3 and the second separate supply module 4 are connected to each other.

After the connection of the first and second separate supply module 3, 4, the holding device 5 is released from the first separate supply module 3. The supply module 3 is unhooked from the support module 8. The separate supply modules 3, 4 which are connected to each other are lowered further into the tower interior by the crane until the upper edge 47 of the second separate supply module 4 is arranged at the upper end of the wind turbine tower 1. The second separate supply module 4 is then hung on the holding device 5 by means of the mounting element 49, which is fastened to the separate supply module 4, and the support module 8, and released from the crane. In an alternative embodiment, the supply module is hung by means of lifting slings of the holding device 5. The abovementioned steps are repeated for all of the separate supply modules to be fitted, except for the final one. In a first embodiment, the final separate supply module is fastened to the holding device 5 via the connecting devices 52. For this purpose, the connecting devices 52 are guided through the holding eyes 39 of the support plate 54 of the final separate supply module and locked.

In an alternative embodiment, the support plate of the final separate supply module is of angled design. The final separate supply module can be hung over the tower upper edge with the aid of the angled support plate 54 and fastened there with bolts. Furthermore, the angled support plate 54 can be fastened to a tubular steel tower 18 to be placed onto the concrete tower 19.

After the introduction of all of the further separate supply modules 4 into the tower interior, the first separate supply module 3 is arranged at the tower base and forms the lowermost separate supply module. After the connection and lowering of the separate supply modules 3, 4, the complete supply module hangs on the holding device 5. In a further step, the separate supply modules 3, 4 are connected to the tower inner wall 7 by the fastening pieces 91 being fastened to the tower inner wall 7. Furthermore, the fastening elements 93 are actuated such that the supply modules 3, 4 can be pulled onto the tower inner wall 7 via the clamping elements 92 and the guide elements 94. By means of the connection to the tower inner wall via the fastening device 9, in particular a displacement of the supply module in a horizontal plane is prevented. The main load of the supply module hangs on the holding device 5.

After the fitting of the supply modules into the concrete tower 19, a tubular steel tower 18 is placed onto the concrete tower 19. The system components 33, 34, 35, 36 installed in the tubular steel tower 18 are connected to the upper segment ends 40. The lower segment ends 31 of the first separate supply module 3 are optionally likewise connected to the system components 33, 34, 35, 36 installed in the tower base.

The invention claimed is:

1. A method for installing tower fittings into a wind turbine tower comprising:
   arranging a first separate supply module of at least two separate supply modules at an upper end of the wind turbine tower such that an upper edge of the first supply module is located at the upper end of the wind turbine tower, wherein each separate supply module of the at least two separate supply modules comprises one segment each of at least two system components of the wind turbine tower;
   after arranging the first separate supply module at the upper end of the wind turbine tower, moving a second separate supply module of the at least two separate supply modules into position adjacent to the first separate supply module so that the first and second separate supply modules are aligned;
   after moving the second separate supply module into position, connecting an upper segment end arranged on the upper edge of the first separate supply module to a lower segment end arranged on a lower edge of a corresponding system component of the second separate supply module; and
   arranging an upper edge of the second separate supply module at the upper end of the wind turbine tower by lowering the first separate supply module and the second separate supply module.

2. The method of claim 1, comprising providing a working platform at the upper end of the wind turbine tower prior to arranging the upper edge of the first separate supply module at the upper end of the wind turbine tower.

3. The method of claim 1, wherein, prior to arranging the upper edge of the first separate supply module at the upper end of the wind turbine tower, providing a holding apparatus at the upper end of the wind turbine tower for the at least temporary suspension of a separate supply module.

4. The method of claim 3, wherein the holding apparatus comprises at least one connecting device for connecting to the separate supply module.

5. The method of claim 3, wherein the holding apparatus has at least one load ring which is fastened to a tower wall or a tower upper edge and to which, after introduction of a final separate supply module, the final separate supply module is fastened.

6. The method of claim 3, wherein, after the introduction of a final separate supply module, the final separate supply module is hung over a tower upper edge with the aid of at least one angled support plate and is fastened to a tower wall or tower upper edge.

7. The method of claim 3, wherein the connecting device comprises at least one shackle or at least one lifting sling.

8. The method of claim 3, wherein the holding apparatus comprises at least one support element which is fastened to a tower wall and to which a support module comprising a mounting portion is releasably fastened, wherein the first separate supply module has a mounting element with which the first separate supply module, after the arrangement of the upper edge at an upper end of the wind turbine tower, is mounted on the mounting portion of the support module.

9. The method of claim 3, comprising suspending the first separate supply module at the upper end of the wind turbine tower prior to connection of the segments of the system components of the first and second separate supply modules.

10. The method of claim 1, comprising forming the wind turbine tower from at least two tower segments.

11. The method of claim 10, wherein a separate supply module of the at least two separate supply modules spans a plurality of tower segments.

12. The method of claim 1, wherein the system components comprise a power conductor, a signal conductor, an illuminator or a climbing device for operating personnel.

13. The method of claim 1, comprising installing a tubular steel tower as an upper part of the wind turbine tower, wherein the lower part is a concrete tower; and
   introducing the at least two separate supply modules into the concrete tower prior to installing the tubular steel tower.

14. The method of claim 1, wherein, prior to arranging the upper edge of the first separate supply module at the upper end of the wind turbine tower, fastening at least one fastening apparatus to at least one of the separate supply modules, wherein the at least one fastening apparatus comprises a clamping element which is connected to the supply module and a guide element comprising a fastening piece projecting laterally on the supply module, which is arranged between the clamping element and the supply module.

15. The method of claim 14, wherein,
   after introduction of a final separate supply module, the fastening apparatus is fastened to the tower wall of the wind turbine tower using the fastening piece; and
   the guide element is clamped to the final supply module using the clamping element.

\* \* \* \* \*